United States Patent
Li et al.

(10) Patent No.: US 9,501,278 B2
(45) Date of Patent: Nov. 22, 2016

(54) METHOD AND DEVICE FOR DATA TRANSMISSION BETWEEN REGISTER FILES

(75) Inventors: Lihuang Li, Shenzhen (CN); Hui Ren, Shenzhen (CN); Chunyu Tian, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 544 days.

(21) Appl. No.: 14/008,159

(22) PCT Filed: Aug. 22, 2011

(86) PCT No.: PCT/CN2011/078721
§ 371 (c)(1),
(2), (4) Date: Sep. 27, 2013

(87) PCT Pub. No.: WO2012/136037
PCT Pub. Date: Oct. 11, 2012

(65) Prior Publication Data
US 2014/0019730 A1    Jan. 16, 2014

(30) Foreign Application Priority Data
Apr. 7, 2011    (CN) .......................... 2011 1 0086342

(51) Int. Cl.
*G06F 9/32*    (2006.01)
*G06F 9/30*    (2006.01)
*G06F 9/38*    (2006.01)

(52) U.S. Cl.
CPC ......... *G06F 9/30079* (2013.01); *G06F 9/3013* (2013.01); *G06F 9/30032* (2013.01); *G06F 9/3867* (2013.01)

(58) Field of Classification Search
CPC ....................................................... G06F 9/34
See application file for complete search history.

(56) References Cited

U.S. PATENT DOCUMENTS 5,799,163 A  *  8/1998  Park ................... G06F 9/30018
                                                        712/205
6,327,647 B1    12/2001  Moyer et al.
(Continued)

FOREIGN PATENT DOCUMENTS

CN           1560729 A     1/2005
CN         101876892 A    11/2010
(Continued)

OTHER PUBLICATIONS

International Search Report in international application No. PCT/CN2011/078721, mailed on Jan. 19, 2012. (2 pages—see entire document).

(Continued)

*Primary Examiner* — Cheng-Yuan Tseng
(74) *Attorney, Agent, or Firm* — Oppedahl Patent Law Firm LLC

(57) ABSTRACT

The present disclosure discloses a method and device for data transmission between register files. The method includes that: data in a source register file are read at a Stage i of a pipeline; and the read data are transmitted to a destination register file using an idle instruction pipeline. With the method of the present disclosure, data and mask information are transmitted using an idle instruction pipeline, without addition of extra registers for data and control information buffering, thus reducing logic consumption as well as increasing utilization of an existing functional unit.

4 Claims, 1 Drawing Sheet

(56) References Cited

U.S. PATENT DOCUMENTS

| | | | |
|---|---|---|---|
| 6,505,290 | B1 | 1/2003 | Moyer et al. |
| 6,889,317 | B2 * | 5/2005 | Sami .................... G06F 9/3826 712/218 |
| 2002/0049894 | A1 | 4/2002 | Moyer et al. |
| 2005/0240930 | A1 | 10/2005 | Amamiya et al. |
| 2006/0095723 | A1 | 5/2006 | Moyer et al. |

FOREIGN PATENT DOCUMENTS

| | | |
|---|---|---|
| JP | 03006768 A | 1/1991 |
| JP | 03521035 A | 7/2003 |
| JP | 2005284749 A | 10/2005 |
| KR | 20040005829 A | 1/2004 |
| WO | 2004023291 A1 | 3/2004 |

OTHER PUBLICATIONS

English Translation of the Written Opinion of the International Search Authority in international application No. PCT/CN2011/078721, mailed on Jan. 19, 2012. (7 pages—see entire document).

English Translation of the Notification of Reasons for Refusal in JP2014-502973, mailed on Nov. 25, 2014 (3 pages—see entire document).

Notification of Reasons for Refusal in JP2014-502973, mailed on Nov. 25, 2014 (3 pages—see entire document).

* cited by examiner

METHOD AND DEVICE FOR DATA TRANSMISSION BETWEEN REGISTER FILES

TECHNICAL FIELD

The present disclosure relates to the field of data-transmission, and in particular to a method and device for data transmission between register files.

BACKGROUND

Most processors adopt a pipeline architecture. In a pipeline, there are some fixed operations in each stage, for example, reading data from a certain register file, performing calculation, and then writing a result of the calculation back into a register file. There may also be multiple register files in a processor.

In an existing integrated-circuit (IC) design, data transfer between register files are normally implemented through a data bus. Data are read from a source register file, go through relevant control logics, and are written into a destination register file through a data bus. For example, a certain processor needs to read data from register file A at the Stage i of the pipeline, and to write the data back into register file B in a Stage (i+j) of the pipeline after an instruction-pipeline delay of j stages.

During transmission of the data, transmission through a data bus requires addition of registers to buffer data and control information, which adds to resource consumption.

SUMMARY

In view of this, a main objective of the overview is to provide a method and device for data transmission between register files, which method and device are capable of reducing logic consumption and improving resource utilization.

To achieve this objective, a technical solution of the present disclosure is implemented as follows.

A method for data transmission between register files includes:

data in a source register file are read at a Stage i of an instruction pipeline; and the read data are transmitted to a destination register file using an idle instruction pipeline.

In the above solution, the step that data in a source register file are read at a Stage i of an instruction pipeline may include:

the read data are written into a temporary register x, and a preset mask is written into a temporary register y.

In the above solution, the step that the read data are transmitted to a destination register file using an idle instruction pipeline may include:

at a Stage (i+1), data in the temporary register y and data in the temporary register x are combined into {y, x}, and the {y, x} is written into the Stage (i+1) of the idle instruction pipeline; and the data flows stage by stage along the idle instruction pipeline into a next stage, after j clock cycles, the data are taken from the idle instruction pipeline to the destination register file at a Stage (i+j).

In the above solution, the step that the data are taken from the idle instruction pipeline to the destination register file at a Stage (i+j) may include:

a part x of the {y, x} is taken as a data unit, n copies of the data unit are combined to obtain extended data with a length equal to n times of the length of the data unit, and the extended data are written into a temporary register j; and a part y of the {y, x} is taken as a mask; and a data unit in a section in the temporary register j corresponding to an effective bit of the mask is written into a corresponding section in the destination register file.

In the above solution, the source register file may be of 32 bits; the destination register file may be of 1024 bits; the n may be 32; and the idle instruction pipeline may be a 64-bit instruction pipeline.

A device for data transmission between register files, includes a source storage unit and a destination storage unit, wherein the source storage unit is configured to read data from a source register file at a Stage i of an instruction pipeline, and to transmit the read data to a destination register file using an idle instruction pipeline; and the destination storage unit is configured to, after j clock cycles, take the data from the idle instruction pipeline to a destination register file at a Stage (i+j).

The source storage unit may be a source register file; and the destination storage unit may be a destination register file.

The source storage unit may specifically be configured to: at a Stage (i+1), combine data in a temporary register y and data in a temporary register x into {y, x}, and to write the {y, x} into the Stage (i+1) of the idle instruction pipeline, such that the data may flow stage by stage along the idle instruction pipeline into a next stage, until after j clock cycles, the data may be taken from the idle instruction pipeline to the destination register file at the Stage (i+j).

The destination storage unit may specifically be configured to: after j clock cycles, take a part x of the {y, x} as a data unit, to combine n copies of the data unit to obtain extended data with a length equal to n times of the length of the data unit, and then to write the extended data into a temporary register j; and to take a part y of the {y, x} as a mask; and to write a data unit in a section in the temporary register j corresponding to an effective bit of the mask into a corresponding section in the destination register file.

The source register file may be of 32 bits; the destination register file may be of 1024 bits; the n may be 32; and the idle instruction pipeline may be a 64-bit instruction pipeline.

It can be seen from the aforementioned technical solutions provided by the present disclosure that: data in a source register file are read at a Stage i of an instruction pipeline, and the read data are transmitted to a destination register file using an idle instruction pipeline. With the solution of the present disclosure, data and mask information are transmitted using an idle instruction pipeline, without addition of extra registers for data and control information buffering, thus reducing logic consumption as well as increasing utilization of an existing functional unit.

The solutions of the present disclosure applies to processor design in a case where there are multiple instruction pipelines in the processor, and after being read from the source register file at the Stage i of an instruction pipeline, data need to go through a clock delay of j stages before being written into the destination register file.

DETAILED DESCRIPTION

Figure 1:
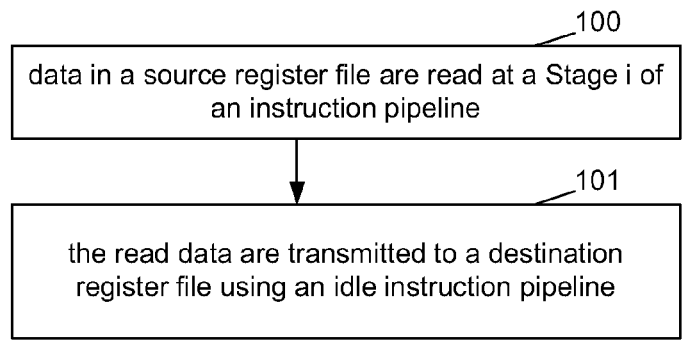
FIG. 1 is a flowchart of a method for data transmission between register files according to the present disclosure.

FIG. 1 is a flowchart of a method for data transmission between register files according to the present disclosure. As shown in FIG. 1, the method includes the following steps.

Step 100: data in a source register file are read at a Stage i of an instruction pipeline.

Specifically, in this step, the read data are written into a temporary register x, and a preset mask is written into a temporary register y. Using of a mask is routine technical means for a person skilled in the art, for example: when 16-bit data need to be written into a 64-bit register, 4 copies of the data may be used to form 64-bit data, then a 4-bit mask is used, that is, the copy in a section of the 64-bit data corresponding to a bit of the mask with a value of 1 (high) is written into a corresponding section in the register, which is not elaborated further here.

Step 101: the read data are transmitted to a destination register file using an idle instruction pipeline.

In this step, at a Stage (i+1), data in the temporary register y and data in the temporary register x are combined into {y, x} which in turn is written into the Stage (i+1) of the idle instruction pipeline; then the data flow stage by stage along the idle instruction pipeline into a next stage. In the method according to the present disclosure, the idle instruction pipeline serves as a data bus. After j clock cycles, the data are taken down from the idle instruction pipeline at the Stage (i+j). The buffered x part is taken as a data unit, n copies of which are combined into extended data with a length equal to n times of the length of x, and are written into a temporary register j. The y part is taken as a mask, a data unit in a section in the temporary register j corresponding to an effective bit in the mask, for example, a bit with a value of 1, is written into a corresponding section in the directed destination register file, and correspondingly, data in a section in the destination register file corresponding to an ineffective bit of the mask remains unchanged.

In an example, n is the ratio of the size of a destination register file over that of the source register file, namely, a multiple. For example, when the source register file is of 32 bits, and the destination register file is of 1024 bits, then n=32.

With the method of the present disclosure, data and mask information are transmitted using an idle instruction pipeline, without addition of extra registers for data and control information buffering, thus reducing logic consumption as well as increasing utilization of an existing functional unit.

The method according to the present disclosure is further elaborated below with reference to embodiments.

In the embodiment, there are two register files, namely, register file A and register file B, data of one unit may be stored in a register pair in register file A, and data of n units may be stored in a register pair in register file B. In the embodiment, register file A is of 32 bits, register file B is of 1024 bits, then n=32. There are two instruction pipelines in a system, one is a 32-bit instruction pipeline, and the other is a 64-bit instruction pipeline.

Figure 2:
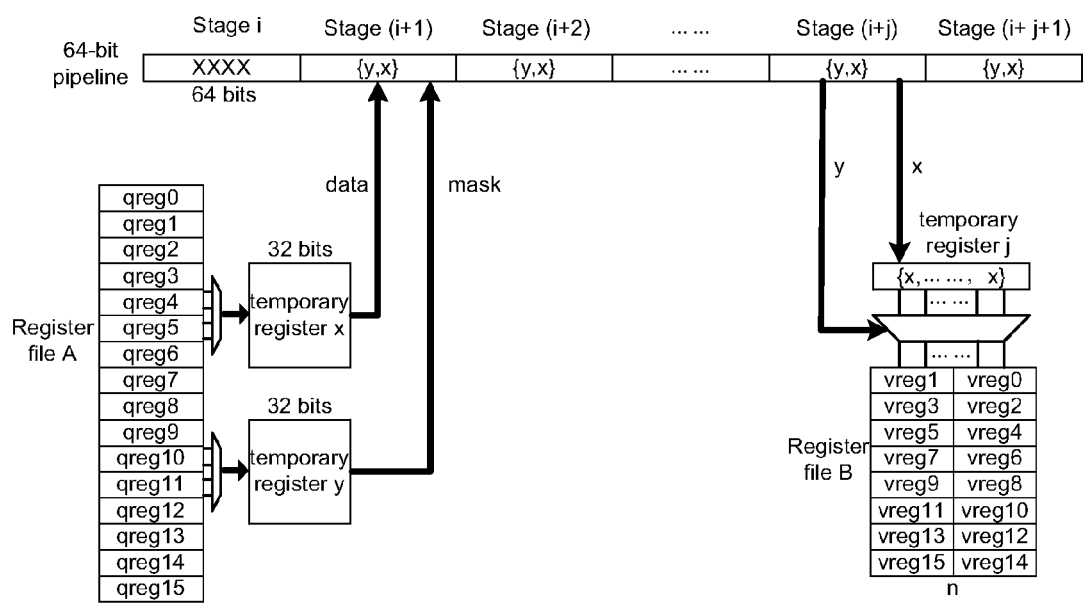
FIG. 2 is a schematic view of transmission in an embodiment of the method for data transmission between register files according to the present disclosure.

In the embodiment, it is required to transmit data in register file A into register file B. That is, data in register file A are read at the Stage i of the pipeline, then after a clock delay of j stages, are written into register file B at the Stage (i+j). FIG. 2 is a schematic view of transmission in an embodiment of the method for data transmission between register files according to the present disclosure. As shown in FIG. 2, the specific implementation includes the followings.

When a data transmission instruction is effective, source data read from register file A are written into the temporary register x at the Stage i, the read mask is written into the temporary register y. At the Stage (i+1), data in the temporary register y and data in the temporary register x are combined into {y, x}, and then are written into the idle 64-bit instruction pipeline, in which case, the 64-bit instruction pipeline serves as a data bus. After j clock cycles, at the Stage (i+j), data {y, x} are taken down from the 64-bit instruction pipeline. The x part of {y, x} is taken as a data unit, n copies of the data unit x are combined into extended data with a length equal to n times of the length of the data unit, and then the extended data are written into temporary register j. The y part in data {y, x} is taken down from the 64-bit instruction pipeline as a mask signal. In the embodiment, a data unit in a section in the temporary register j corresponding to a bit of the mask with a value of 1 (high) is written into a corresponding section of a register pair of the directed register file B. As shown in FIG. 2, masked writing of the data is thus achieved.

Figure 3:
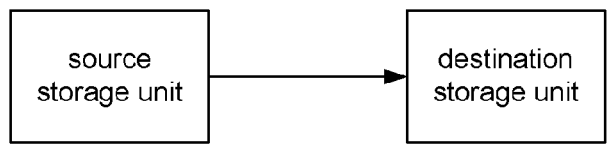
FIG. 3 is a schematic view of a structure of a device for data transmission between register files according to the present disclosure.

FIG. 3 is a schematic view of a structure of a device for data transmission between register files according to the present disclosure. As shown in FIG. 3, the device includes a source storage unit and a destination storage unit.

The source storage unit is configured to read data from a source register file at a Stage i of an instruction pipeline, and to transmit the read data to a destination register file using an idle instruction pipeline. The source storage unit is a source register file.

The destination storage unit is configured to, after j clock cycles, take the data from the idle instruction pipeline to the destination register file at a Stage (i+j). The destination storage unit is a destination register file.

The source storage unit may be specifically configured to: at a Stage (i+1), combine data in a temporary register y and data in a temporary register x into {y, x}, and to write the {y, x} into the Stage (i+1) of the idle instruction pipeline, such that the data flow stage by stage along the idle instruction pipeline into a next stage, after j clock cycles, the data is taken from the idle instruction pipeline to the destination register file at the Stage (i+j).

The destination storage unit may be specifically configured to: after j clock cycles, take a part x of the {y, x} as a data unit, to combine n copies of the data unit to obtain extended data with a length equal to n times of the length of the data unit, and then to write the extended data into a temporary register j; and to take a part y of the {y, x} as a mask; and to write a data unit in a section in the temporary register j corresponding to an effective bit of the mask into a corresponding section in the destination register file.

When the source register file is of 32 bits, and the destination register file is of 1024 bits, the n equals 32; and the idle instruction pipeline is a 64-bit instruction pipeline.

What described are merely preferred embodiments of the present disclosure, and are not intended to limit the scope of the present disclosure. Any modification, equivalent replacement, improvement, and the like made within the principle of the present disclosure shall be included in the scope of the present disclosure.

The invention claimed is:

1. A method for data transmission between register files, comprising:
   at a Stage i of an instruction pipeline, reading, from a source register file, data and a mask for the data: writing the read data into a temporary register x; and writing the read mask into a temporary register y;
   at a Stage (i+1) of the instruction pipeline, combining data in the temporary register y and data in the temporary register x into {y, x}, and writing the {y, x} into a Stage (i+1) of an idle instruction pipeline;
   letting the data {y, x} flow stage by stage along the idle instruction pipeline into a next stage; and
   at a Stage (i+j) of the instruction pipeline, fetching the data {y, x} from the idle instruction pipeline, and writing the fetched data into a destination register file,
   wherein the fetching the data {y, x} from the idle instruction pipeline, and writing the fetched data into a destination register file comprises:
   taking a part x of the {y, x} as a data unit, combining n copies of the data unit to obtain extended data with a length equal to n times of the length of the data unit, and writing the extended data into a temporary register j; and taking a part y of the {y, x} as a mask; and
   writing a data unit in a section in the temporary register j corresponding to an effective bit of the mask into a corresponding section in the destination register file.

2. The method according to claim 1, wherein the source register file is of 32 bits; the destination register file is of 1024 bits; the n is 32; and
   the idle instruction pipeline is a 64-bit instruction pipeline.

3. A device for data transmission between register files, comprising a reading module and a transmitting module, wherein
   the reading module is configured for:
      at a Stage i of an instruction pipeline, reading, from a source register file, data and a mask for the data: writing the read data into a temporary register x; and writing the read mask into a temporary register y; and
   the transmitting module is configured for:
      at a Stage (i+1) of the instruction pipeline, combining data in the temporary register y and data in the temporary register x into {y, x}, and writing the {y, x} into a Stage (i+1) of an idle instruction pipeline:
      making the data {y, x} flow stage by stage along the idle instruction pipeline into a next stage; and
      at a Stage (i+i) of the instruction pipeline, fetching the data {y, x} from the idle instruction pipeline, and writing the fetched data into a destination register file,
   wherein the transmitting module is configured to
   take a part x of the {y, x} as a data unit, combine n copies of the data unit to obtain extended data with a length equal to n times of the length of the data unit, and write the extended data into a temporary register j; and take a part y of the {y, x} as a mask; and
   write a data unit in a section in the temporary register j corresponding to an effective bit of the mask into a corresponding section in the destination register file.

4. The device according to claim 3, wherein the source register file is of 32 bits; the destination register file is of 1024 bits; the n is 32; and
   the idle instruction pipeline is a 64-bit instruction pipeline.

* * * * *